United States Patent [19]

Nakata

[11] 4,434,354

[45] Feb. 28, 1984

[54] THERMAL PRINTER

[75] Inventor: Shinichi Nakata, Yokohama, Japan

[73] Assignee: Canon Kabushiki Kaisha, Tokyo, Japan

[21] Appl. No.: 338,378

[22] Filed: Jan. 11, 1982

[30] Foreign Application Priority Data

Feb. 3, 1981 [JP] Japan .................................. 56-14521

[51] Int. Cl.³ ........................ H05B 1/00; G01D 15/10

[52] U.S. Cl. ............................... 219/216; 346/76 PH; 400/120

[58] Field of Search ........ 219/216; 346/76 R, 76 PH; 178/30; 400/120

[56] References Cited

U.S. PATENT DOCUMENTS

| | | | |
|---|---|---|---|
| 3,874,493 | 4/1975 | Boyd | 346/76 PH |
| 3,934,695 | 1/1976 | Kovalick | 219/216 |
| 3,975,707 | 8/1976 | Ito et al. | 346/76 R |
| 4,113,391 | 9/1978 | Minowa | 219/216 |
| 4,168,421 | 9/1979 | Ito | 219/216 |
| 4,219,824 | 8/1980 | Asai | 219/216 |
| 4,262,188 | 4/1981 | Beach | 219/216 |
| 4,305,080 | 12/1981 | Cunningham | 219/216 |
| 4,309,712 | 1/1982 | Iwakura | 346/76 PH |
| 4,330,786 | 5/1982 | Hatabe | 219/216 |
| 4,360,819 | 11/1982 | Saito et al. | 219/216 PH |
| 4,370,666 | 1/1983 | Noda | 346/76 PH |

FOREIGN PATENT DOCUMENTS

| | | | |
|---|---|---|---|
| 56-40572 | 4/1981 | Japan | 400/120 |

*Primary Examiner*—B. A. Reynolds
*Assistant Examiner*—Teresa J. Walberg
*Attorney, Agent, or Firm*—Fitzpatrick, Cella, Harper & Scinto

[57] ABSTRACT

A thermal printer has a circuit arrangement for extending a duty cycle of a thermal head as a battery voltage drops in order to maintain a record density at a constant level.

3 Claims, 4 Drawing Figures

THERMAL PRINTER

BACKGROUND OF THE INVENTION

Description of the Prior Art

In a battery driven thermal printer, in order to prevent the decrease of the record density as the battery voltage drops, a DC—DC converter is used to maintain a voltage applied to a recording head at a constant level or a battery which exhibits a relatively low voltage drop due to the reduction of a battery capacity (e.g. nickel-cadmium cell) is used. However, when the DC—DC converter is used, a large energy is consumed by the DC—DC converter per se and hence a utility efficiency of the battery is not improved. On the other hand, the nickel-cadmium cell is expensive.

SUMMARY OF THE INVENTION

It is an object of the present invention to provide a thermal printer which assures a constant record density independently of a change in a battery voltage even when a battery having a large voltage drop and a large internal resistance is used.

In accordance with the present invention, a record condition is controlled in accordance with the battery voltage so that the record density is kept constant.

DETAILED DESCRIPTION OF THE PREFERRED EMBODIMENT

Figure 1:
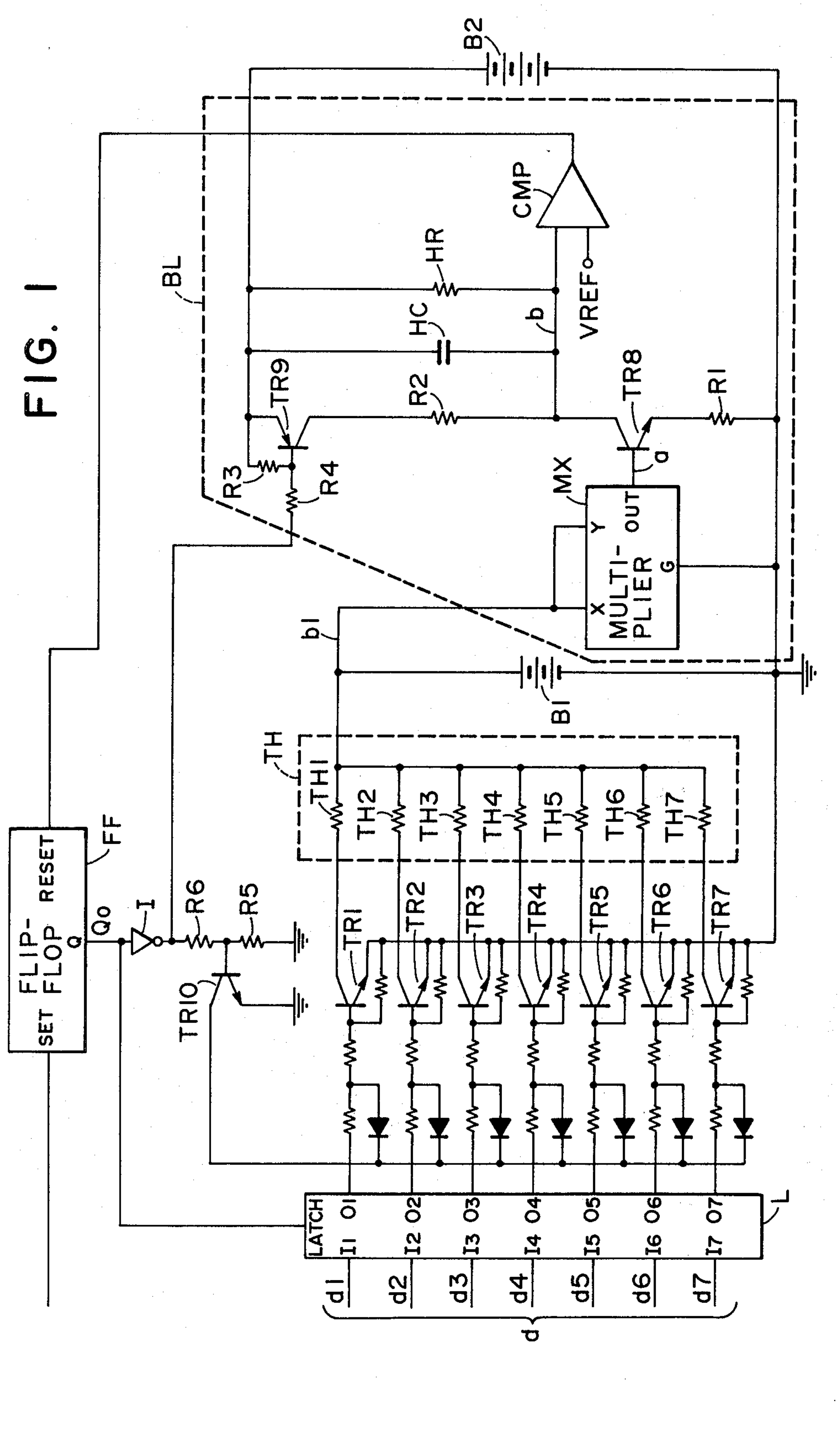
FIG. 1 shows a circuit diagram of one embodiment of the present invention.

Referring to FIG. 1 it include a drive circuit for a thermal head in accordance with one embodiment of the present invention. Symbol L denotes a 7-bit latch for storing a print pattern, TR1–TR7 denote driver elements for driving thermal elements TH1–TH7 of a thermal head TH in response to the signal from the latch L, B1 denotes a battery for supplying an energy to the thermal head TH, MX is a commercially available analog multiplier, CMP denotes an analog comparator, B2 denotes a battery, FF denotes a set-reset type flip-flop and I denotes an inverter. In order to heat the first dot TH1 of the thermal head, "1" data is applied to a line d1 and a set signal S of the flip-flop FF is momentarily changed to "1". As a result, an output Q0 of the flip-flop FF changes to "1". In response to the output Q0, the latch L latches the data d2–d7 at the rise of the output Q0 which changes from "0" to "1", and produces outputs O1–O7. In response to the output Q0 of the flip-flop FF, the inverter I causes the transistor TR10 to turn off when the output Q0 changes to "1" so that the outputs O1–O7 of the latch L are conveyed to the bases of the transistors Tr1–TR7. Assuming that only the data d1 is "1", only the output O1 is "1" and the outputs O2–O7 are "0". As a result, the transistor TR1 is turned on to heat the thermal element TH1. Since the power for heating the thermal element TH1 is supplied from the battery B1, if the battery capacity of the battery B1 has decreased, a terminal voltage b1 of the battery B1 falls as a load is applied. In the prior art thermal printer, the thermal head is heated for a constant period of time independently of the battery voltage. However, when the battery capacity has decreased as assumed above, the print density is lowered if the head is heated for the constant period of time. In the present invention, the thermal constants of the thermal head are simulated by a capacitor and a resistor and the thermal head is heated until the heat generated thereby reaches a predetermined level.

Figure 2A:
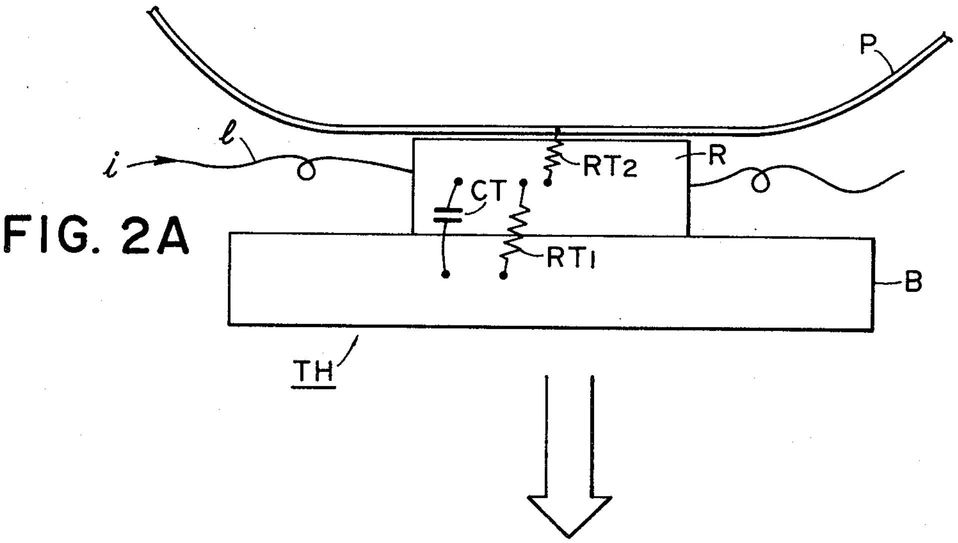
FIG. 2A shows a perspective view of the thermal head.
Figure 2B:
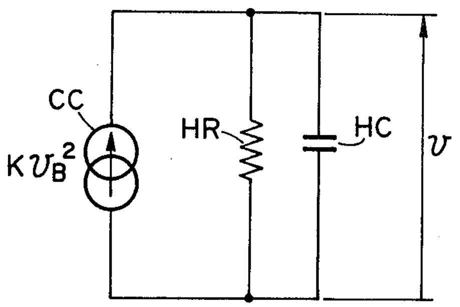
FIG. 2B shows equivalent circuit for thermal parameters of a thermal head shown in FIG. 2A.

Referring to FIG. 2 a principle of the present invention is described. FIG. 2A shows a sectional view of the thermal head. Symbol R denotes a heater, B denotes a base, P denotes a heat sensitive paper and l denotes a lead wire for conducting a current. The thermal constants include a thermal capacitance CT when the heater R is in contact with the heat sensitive paper P, a thermal resistance RT1 between the heater R and the base B and a thermal resistance RT2 between the heater R and the heat sensitive paper P. Those thermal constants are substituted by a capacitor and a resistor as shown in FIG. 2B, in which HC denotes a capacitor, HR denotes a resistor having a combined thermal resistance of RT1 and RT2 and CC denotes a current source. When a current i (t) is supplied to the thermal head TH, a temperature T of the heater R corresponds to a voltage V across the capacitor HC in the circuit of FIG. 2B. The energy supplied to the thermal head TH is substituted by the current source CC with is proportional to square of the voltage applied to the thermal head TH.

Figure 3:
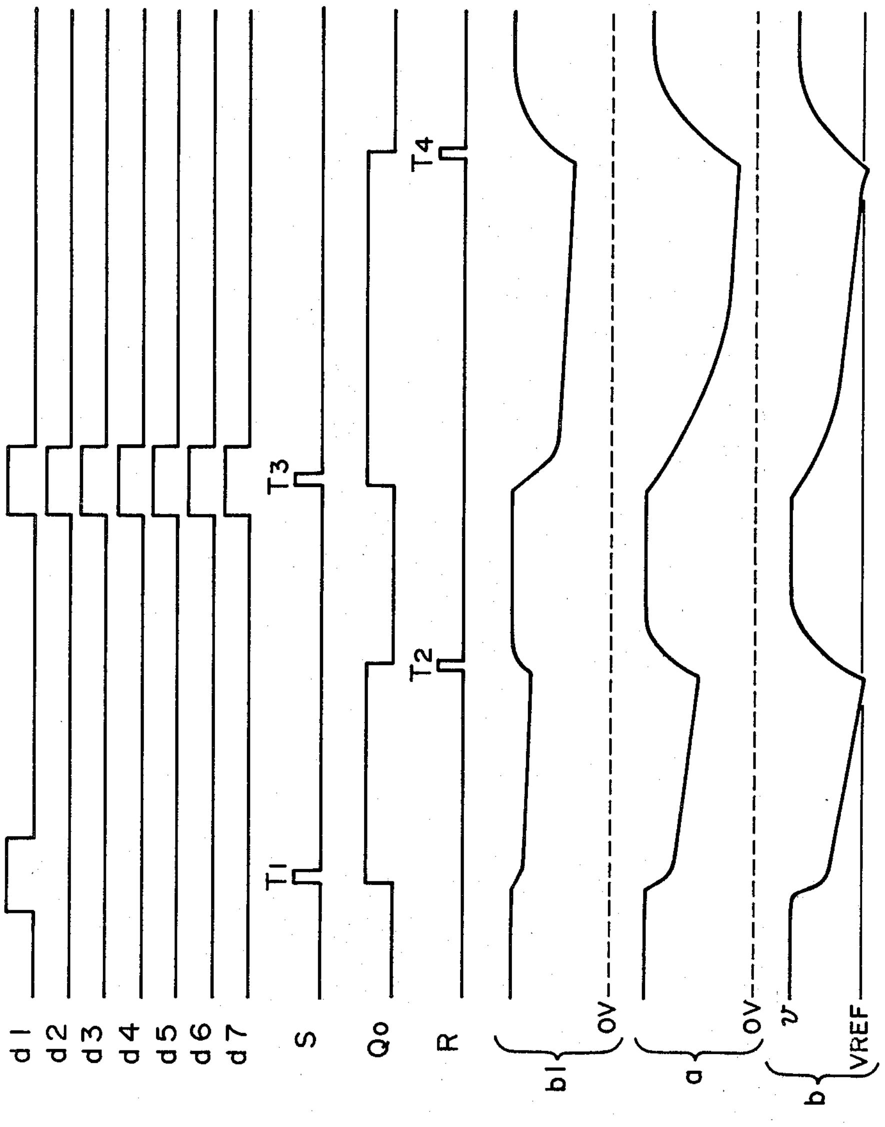
FIG. 3 shows waveforms of voltage at various points in FIG. 1.

The circuit of FIG. 2B is embodied in a broken line block BL shown in FIG. 1. The multiplier MX has two input terminals X and Y and produces an output which is proportional to a product of analog quantities at the input terminals X and Y. The operation of the multiplier is not explained here because the multiplier is commercially available and the operation is well known. The two input terminals X and Y of the multiplier MX are shunted and the battery voltage b1 is applied thereto. A voltage of K (X×Y) or K $(b1)^2$ is produced at an output terminal OUT. (See waveform a in FIG. 3). This output voltage is directly supplied to a base of the transistor TR8 an emitter of which is connected to a resistor R1. Thus, a collector current ic of the transistor TR1 is given by $$ic \approx \frac{K(b1)^2}{R_1}$$

Thus, the current proportional to $(b1)^2$ flows. Since the output Q0 of the flip-flop FF is "1", the transistor TR9 is off and the voltage b across the capacitor HC starts to fall. Since the capacitor HC and the resistor HR are equivalent substitution of the thermal constants of the thermal head, the temperature rise in the thermal head TH is proportional to the voltage b across the capacitor HC. When the voltage b reaches a reference voltage VREF which is set to a voltage equivalent to a temperature at which heating of the thermal head TH is to be stopped, an output signal R of the comparator CMP changes to "1", which is supplied to a reset terminal of the flip-flop FF so that the output Q0 is changed to "0". As a result, the output Q0 causes the transistor TR10 to turn on, through the inverter I. Accordingly, the thermal head drivers TR1–TR7 are cut off and the thermal head TH is deenergized. The inverter I also turns on the transistor TR9 so that the charge stored in the capacitor HC is discharged. As the capacitor HC is discharged, the voltage b of the capacitor HC rises and the comparator CMP again produces the "0" output. (See signals b and R at time point T2 in FIG. 3).

The operation in which all dots of the thermal head TH are heated is now explained. When the print data d1–d7 are all "1" and the start signal S is momentarily changed to "1" (see time point T3 in FIG. 3), all of the thermal head drivers TR1–TR7 are turned on to heat the thermal head TH. Since the load to the battery B1 is high, the voltage drop of the battery B1 is high and hence the output voltage a from the multiplier MX is low and the current flowing into the collector of the transistor TR8 is small. As a result, the voltage b of the capacitor HC falls slowly. (See a time period T3–T4 in FIG. 3). When the voltage b of the capacitor HC reaches VREF, the heating of the thermal head TH is stopped. (See time point T4 in FIG. 3).

In this manner, by extending the duty cycle of the thermal head when the battery voltage drops, the density is kept constant. In the present system, the print density is kept constant even when a battery of different voltage is used. Accordingly, many types of batteries can be used. While a solar cell changes its output voltage depending on a surrounding light condition, the print density is kept constant in accordance with the present invention. The present invention is also applicable to other types of print heads and printers.

What I claim is:

1. A thermal printer comprising:
a thermal head having a plurality of heating elements;
a first power supply for energizing said heating elements of said thermal head;
a single capacitor for converting the temperature of said thermal head into an electrical signal;
a comparator for comparing said electrical signal from said single capacitor and a reference voltage applied thereto to produce an output signal in response to a variation in voltage of said first power supply; and
control means for controlling a time period of energizing all of said heating elements of said thermal head in response to the output signal from said comparator.

2. A thermal printer according to claim 1, further comprising a second power supply for operating said comparator.

3. A thermal printer according to claim 1, wherein said control means controls the time period of energizing said plurality of heating elements in accordance with the number of said heating elements which are simultaneously heated.

* * * * *